(12) United States Patent
Krampe

(10) Patent No.: US 11,035,361 B2
(45) Date of Patent: Jun. 15, 2021

(54) ECCENTRIC SCREW PUMP

(71) Applicant: Hugo Vogelsang Maschinenbau GmbH, Essen (DE)

(72) Inventor: Paul Krampe, Essen (DE)

(73) Assignee: Hugo Vogelsang Maschinenbau GmbH, Essen (DE)

(*) Notice: Subject to any disclaimer, the term of this patent is extended or adjusted under 35 U.S.C. 154(b) by 120 days.

(21) Appl. No.: 16/262,265

(22) Filed: Jan. 30, 2019

(65) Prior Publication Data
US 2019/0162183 A1 May 30, 2019

Related U.S. Application Data

(63) Continuation of application No. 14/708,426, filed on May 11, 2015, now Pat. No. 10,233,924.

(30) Foreign Application Priority Data

May 12, 2014 (EP) .................................. 14167930

(51) Int. Cl.
*F04C 2/107* (2006.01)
*F04C 18/107* (2006.01)
(Continued)

(52) U.S. Cl.
CPC ............ *F04C 2/1075* (2013.01); *F04C 2/107* (2013.01); *F04C 2/1071* (2013.01);
(Continued)

(58) Field of Classification Search
CPC .............. F04C 15/0065; F04C 15/0073; F04C 29/0057; F04C 29/0071; F04C 2/1071; F04C 2/1075
See application file for complete search history.

(56) References Cited

U.S. PATENT DOCUMENTS 2,028,407 A * 1/1936 Moineau ................... E21B 4/02
                                                              418/48
2,545,604 A * 3/1951 Byram .................. F04C 2/1073
                                                              418/48
(Continued)

FOREIGN PATENT DOCUMENTS

DE      1163148 B    2/1964
DE      1916195 U    5/1965
(Continued)

OTHER PUBLICATIONS

Malaysia Patent Application No. PI 2015701507, Office Action, dated Nov. 8, 2019, 3 pages.
(Continued)

*Primary Examiner* — Anthony Ayala Delgado
(74) *Attorney, Agent, or Firm* — Kilpatrick Townsend & Stockton LLP; Anthony L. Guebert; Dean W. Russell

(57) ABSTRACT

An eccentric screw pump, comprising a rotor that extends along a longitudinal axis of the rotor from a drive end to a free end, a stator housing with an internal cavity that extends along the longitudinal axis from a stator inlet opening to a stator outlet opening and that is designed to accommodate the rotor, a drive motor with a drive shaft that is coupled with the rotor to transmit a torque, a first cardan joint which is placed within the transmission of the torque between the drive shaft and the rotor, and a stator outlet flange that is arranged in flow direction behind the rotor. The stator outlet flange comprises a flange connection plane that is oriented non-vertically to the longitudinal axis.

17 Claims, 5 Drawing Sheets

(51) Int. Cl.
 *F04C 29/00* (2006.01)
 *F04C 15/00* (2006.01)
 *F01C 21/10* (2006.01)

(52) U.S. Cl.
 CPC ...... *F04C 15/0065* (2013.01); *F04C 15/0073* (2013.01); *F04C 18/107* (2013.01); *F04C 29/0057* (2013.01); *F04C 29/0071* (2013.01); *F01C 21/10* (2013.01); *F04C 2230/70* (2013.01); *Y10T 29/49817* (2015.01)

(56) References Cited

U.S. PATENT DOCUMENTS

| | | | |
|---|---|---|---|
| 3,139,035 | A | 6/1964 | O'Connor |
| 3,216,768 | A | 11/1965 | Soeding et al. |
| 4,140,444 | A | 2/1979 | Allen |
| 5,688,114 | A | 11/1997 | Millington et al. |
| 5,857,842 | A | 1/1999 | Sheehan |
| 6,120,267 | A | 9/2000 | Cunningham |
| 7,214,042 | B2 * | 5/2007 | Parrett .............. F04B 15/02 418/152 |
| 10,233,924 | B2 | 3/2019 | Krampe |
| 2007/0104595 | A1 | 5/2007 | Jaberg et al. |

FOREIGN PATENT DOCUMENTS

| | | |
|---|---|---|
| DE | 102008021919 A1 | 11/2009 |
| EP | 1921318 A1 | 5/2008 |
| GB | 916155 A | 1/1963 |

OTHER PUBLICATIONS

Europe Patent Application No. 16163387.0, Office Action, dated Nov. 10, 2016.
China Patent Application No. 201501488842.0, Office Action, dated Oct. 8, 2018.
U.S. Appl. No. 14/708,426, Non-Final Office Action, dated Apr. 7, 2017.
U.S. Appl. No. 14/708,426, Final Office Action, dated Dec. 5, 2017.
U.S. Appl. No. 14/708,426, Advisory Action, dated Mar. 14, 2018.
U.S. Appl. No. 14/708,426, Non-Final Office Action, dated Jun. 29, 2018.
U.S. Appl. No. 14/708,426, Notice of Allowance, dated Nov. 23, 2018.
U.S. Appl. No. 14/708,426, Corrected Notice of Allowability, dated Jan. 9, 2019.
Application No. CA 2,891,050, Office Action, dated Mar. 11, 2021, 4 pages.

* cited by examiner

ECCENTRIC SCREW PUMP

CROSS-REFERENCE TO RELATED APPLICATIONS

This application is a continuation of U.S. patent application Ser. No. 14/708,426 filed on May 11, 2015, and titled ECCENTRIC SCREW PUMP, which application claims priority to European Patent Application No. 14167930.8 filed on May 12, 2014, the entire contents each of which are incorporated in their entireties herein by this reference.

TECHNICAL FIELD

The invention relates to eccentric screw pumps and methods for maintaining such eccentric screw pumps.

BACKGROUND

An eccentric screw pump is a displacement pump in which a rotating part, the rotor, moves inside a fixed part, the stator or stator housing. The rotor performs a rotational movement as well as an overlapping radial movement, and thus moves along a circular path while additionally turning about its own axis. The rotor comprises around the outer circumference a type of knuckle thread bolt with a steep pitch which moves inside a cavity in the stator, which is designed such that the movement of the rotor in the stator causes conveyor spaces to move from the inlet side to the outlet side. Typically, the inlet side of the stator/rotor assembly of an eccentric screw pump comprises a feeding chamber for the fluid to be pumped, which is fluidly connected to the stator inlet opening. A drive shaft which, due to the rotor movement, has to perform a wobbling movement, is turning inside this feeding chamber. This drive shaft is typically formed by two cardan joints connected via a wobble shaft and is directly or indirectly coupled with the drive motor on the side opposite from the rotor.

On the inlet side, eccentric screw pumps are typically connected with a feeding pipe via which the fluid to be pumped is fed to the stator housing inlet opening. On the outlet side, eccentric screw pumps are connected with an outlet pipe via which the pumped fluid is conducted away. Generally, eccentric screw pumps are suitable for pumping media in both directions. Accordingly, for the purpose of this disclosure, it is also possible for the conveying direction to be reversed with a corresponding functional switching of the stator inlet opening and the stator outlet opening.

Eccentric screw pumps are suitable for pumping a great variety of very different fluids. This includes, in particular, thick and viscous media which may also contain solids having an abrasive effect.

Generally, but in particular when using an eccentric screw pump to pump fluids in the form of solids-containing media, wear of the stator and possibly also wear of the rotor means that the stator, and possibly also the rotor, will need to be replaced in regular maintenance intervals. For this purpose, the rotor must be disconnected on the drive side and the flange connections of the stator housing must be separated in order to create space to remove the rotor from the stator or to remove the entire rotor-stator unit. This process is regularly time-consuming and costly; due to the considerable weight of the stator and, in particular, the stator-rotor unit, it is also difficult and can be accomplished only with specific tools and a lifting device. The downtime of an eccentric screw pump caused by such necessary maintenance can easily run between several hours to one day. From DE 10 2008 021 919 we already know an eccentric screw pump in which a spacer ring is arranged between the stator and a connection piece for an outlet pipe. By removing this spacer ring, disassembling the stator becomes easier, because once the rotor has been disconnected from the cardan joint, it allows for the rotor to be swung out along with the stator. A disadvantage of this design is the required disconnection of the rotor from the cardan joint for this swiveling movement, which requires a difficult maintenance operation. Another disadvantage of this design is that it creates additional sealing surfaces in the area of the stator outlet opening, i.e. on the pressure side of the eccentric screw pump, which causes a risk of leakage. Moreover, it is disadvantageous that in case of blockage by foreign objects in the area of the outlet opening the removal of the spacer ring may also be blocked by such foreign objects. This could hinder or make impossible the removal of the spacer ring so that, as a result, the maintenance work can no longer be performed in this form.

BRIEF SUMMARY

The invention relates to an eccentric screw pump, comprising a rotor that extends along a longitudinal axis of the rotor from a drive end to a free end, a stator housing with an internal cavity that extends along the longitudinal axis from a stator inlet opening to a stator outlet opening and that is designed to accommodate the rotor, a drive motor with a drive shaft that is coupled with the rotor to transmit a torque, a first cardan joint which is placed within the transmission of the torque between the drive shaft and the rotor, and a stator outlet flange that is arranged in flow direction behind the rotor. A further aspect is a method for maintaining such an eccentric screw pump.

The object of the invention is to provide an eccentric screw pump which allows for simplified maintenance.

According to the invention, this object is achieved by an eccentric screw pump in the type described above, in which the stator outlet flange comprises a flange connection plane that is not oriented vertically to the longitudinal axis.

The eccentric screw pump according to the invention allows for simplified maintenance by making it possible to swivel the stator housing along with the rotor arranged therein without having to remove an inlet pipe and outlet pipe connected to the eccentric screw pump. This swiveling is made possible because the stator outlet flange is located in a plane that runs at a tilted angle to the longitudinal axis of the stator housing. What is meant by such a tilted orientation of the stator outlet flange is an orientation that diverges from the previously known orientation in a 90° angle to the longitudinal axis. In one embodiment of the invention, the stator outlet flange can be oriented parallel to the longitudinal axis. In particular, the stator outlet flange can be located in a plane that is oriented at a tilted angle to the longitudinal axis, i.e. at an angle of between 0 and <90° to the longitudinal axis. The stator outlet flange is a connection flange that is either connected directly to an outlet pipe, the flange plane of which must then be designed accordingly. However, in the preferred configuration, the stator outlet flange is arranged at the end of the stator housing and an adapter connection piece is an integral part of the eccentric screw pump, which connection piece is, on the one hand, connected to the stator outlet flange by means of a flange having the same tilt, while on the other hand, it comprises a pipe nipple on the end opposite hereto, which is designed to connect an outlet pipe with conventional flange connection. This adapter piece can thus remain installed on the connected outlet pipe when doing the required maintenance work since through the disconnection the stator outlet flange and its orientation towards the longitudinal axis it is possible to swivel the stator housing without this requiring any space in the direction of the axis.

The invention recognized that by designing the flange connections on the outlet side of the eccentric screw pump with an orientation of 90°, it is not possible for the stator pipe to swivel out since the increased space requirement in the direction of the longitudinal axis required due to the angle does not exist. Orienting the stator outlet flange in accordance with the invention in a plane other than the plane that is vertical to the longitudinal axis allows for the stator housing to be swung out in a certain direction by providing the required space through the orientation of the flange. The orientation of the flange guarantees that already in the course of the first angular movement sections of the swiveling of the stator housing a distance is generated between the stator outlet flange and the counterpart flange, so that, as a result, a blockage of the swiveling movement by foreign bodies inside the stator outlet flange cannot occur at all or only with reduced frequency.

The orientation of the stator outlet flange thus comprises tilted positions of the stator outlet flange, for example a tilted position at a 45° angle to the longitudinal axis, which allows for the stator housing to swivel out even if additional space is required in an axial direction, for example due to an a need for additional space for this swiveling movement as a result of a connection design of the stator housing. It must fundamentally be understood that the stator outlet flange is preferably oriented in such an angle to the longitudinal axis that it is possible for the stator housing to be swiveled about a swivel axis in the area of the stator inlet opening after the stator housing has been separated, in the area of this stator inlet opening, from a connection housing in which the first cardan joint runs. The swiveling of the rotor can preferable occur about an axis of the first cardan joint which eliminates the need for the first cardan joint to be separated from the rotor in order to perform the swiveling movement.

An alternative embodiment provides for the stator inlet flange to comprise a flange connection plane that is not oriented vertically to the longitudinal axis. This variant of the invention provides for a tilted position of the flange in the area of the flange connection on the inlet side of the stator housing. Moreover, by arranging this stator inlet flange in a tilted position at an angle that is not 90° to the longitudinal axis, it is possible to provide a possibility to swivel the stator housing that does not require any additional axial release on the opposite end of the stator housing. An advantage of this configuration is that the outlet-side end of the stator housing can be fitted with a stator outlet flange that is tilted at a 90° angle to the longitudinal axis and thus allows to connect an outlet pipe with a conventional flange.

It must fundamentally be understood that the stator outlet flange and preferably the stator inlet flange are designed such that the rotor can be inserted through these flanges.

Moreover, it is preferable if the flange connection plane is tilted in relation to the longitudinal axis at an angle that is smaller than (90°-arctan(d/l)), wherein d equals the outer diameter of the end of the stator housing that is opposite from the flange connection plane, and l equals the length of the stator housing. This specification of a certain angle range ensues from the necessities required for a swiveling of the stator housing if the stator housing has a certain length and if its outer diameter at the stator housing end opposite from the tilted flange connection on the stator housing is determined by design constraints. A characteristic feature of this design and the resulting kinematic is the necessity of having to disconnect, on one hand, the stator inlet flange, and on the other hand, the stator outlet flange located opposite hereto at the other end of the stator housing, in order to be able to perform the swiveling. The swiveling of the stator housing then occurs typically about a swivel axis that is located on the stator inlet flange in around the area of the outer circumference of the stator housing, wherein it must be understood that in being swiveled, the rotor can swivel around a swivel axis of the first cardan joint and that at the same time, the rotor or the first cardan joint can move translationally in order to compensate for the distance between the swivel axes of the stator housing and of the rotor. In such a design, In order to achieve a sufficient axial range for the swiveling movement by arranging the flange connection plane in a tilted position, the angle of the flange connection plane must be smaller than 90°-arctan of the quotient of the diameter of the stator inlet flange and the length of the stator housing. From this it ensues that the larger the diameter of the stator inlet flange and the shorter the stator housing, the smaller the angle must be. In a stator housing design where, for example, the diameter of the stator inlet flange and the length of the stator housing are equal, this results in a tilt angle of the flange connection plane of 45° or less in order to allow for a swiveling of the stator housing. If, on the other hand, the length of the stator housing equals double the diameter of the stator inlet flange, an angle of 64° or less is already sufficient in order to guarantee that the stator housing can be swiveled. In a stator housing whose length equals ten times the diameter of the stator inlet flange, the stator housing can already be swiveled if the flange connection plane is tilted at an angle of 84° or less Another preferred embodiment provides that the angle by which the flange connection plane is tilted against the longitudinal axis lies in a horizontal plane. According to this embodiment, the flange connection plane is oriented such that it lies in a vertical plane, i.e. vertically to the horizontal plane. This orientation allows for a swiveling of the stator housing in a horizontal plane, which represents a simplification for maintenance purposes and for the required support of the stator housing while being swiveled. In particular, with this orientation of the flange connection plane, the stator housing can be swiveled sideways such that the rotor is accessible from the stator outlet opening so that it can be removed from the stator housing in a horizontally oriented translational movement or such that the stator housing can be pulled away from the rotor.

Generally, it is understood that the first and/or the second cardan joint can be classic cardan joints with two swivel axes that are vertical to each other. However, other configurations with the same function must also be understood as cardan joint for the purpose of this invention, such as, for example, elastomer couplings which provide a corresponding swiveling movement with simultaneous rotation and torque transmission.

According to another aspect, the eccentric screw pump described at the beginning or the previously described eccentric screw pump can be developed further in that the rotor is connected to the first cardan joint by means of a first shaft-hub connection, and in that the rotor comprises a cavity stretching along the longitudinal axis, and in that a first tensioning element, which is connected with the first shaft-hub connection on the side of the stator inlet opening, stretches through this cavity and can be actuated on the stator outlet opening side with a tool or can be actuated with a tool that reaches through this cavity, and in that the first shaft-hub connection can be connected or disconnected from the side of the stator outlet opening by means of the tool acting on the first tensioning element.

This aspect of the invention or of this further development addresses a specific problem that arises in the maintenance of eccentric screw pumps. In order to remove the rotor from the stator housing, the rotor must typically be separated from the drive shaft of the drive motor. This separation typically occurs at a connection between the first cardan joint and the rotor; this connection is designed as a separable connection for this purpose. It is known from prior art to realize this connection for example through several screws spread around the perimeter of a ring flange, which can the be accessed and removed through a service opening. However, disadvantages include, on one hand, the need for a service opening, which must typically be arranged inside a fluid feeder housing surrounding the fluid feeding chamber, and on the other hand, the labor-intensive unscrewing of these screws in the typically fluid-filled chamber, which is regularly made more difficult due to the screw connection being dirty.

The invention solves this problem by enabling the separation of the rotor from the drive shaft to occur without such a direct unscrewing of screws with tools in direct contact with the first shaft-hub connection between the first cardan joint and the rotor through such a service opening. For this purpose, the rotor has a cavity that extends in the longitudinal direction of the rotor and occupies the entire rotor. Through this cavity it is now possible to separate the connection between the first cardan joint and the rotor. The connection between the rotor and the first cardan joint can be realized in a variety of ways. Thus it is possible to use a force-fit or a form-fit connection or a prestressed form-fit connection.

The cavity in the rotor can be used in two different ways to separate the shaft-hub connection in a simplified manner. In a first variant, a tensioning element extends through the cavity, serving to apply a tensile force on a flange part that is connected to the first cardan joint against a flange element that is connected to the rotor. This tensioning element can, for example, be a tension rod that is realized with a corresponding tensioning device on the stator outlet side, for example an external thread onto which a clamping nut that is supported by the rotor is screwed. In this embodiment, the shaft-hub connection between rotor and first cardan joint can be separated comfortably with mit common tools by loosening this tensioning device at the tensioning element and eliminating the tensile force that creates or secures the connection.

In a second variant, the tensioning element is arranged only on the stator inlet side where it exercises a connective force that secures or creates the shaft-hub connection. Here, one can, for example, use a screw with an internal tool grip surface, which is supported in a ledge inside the rotor and screwed into an internal thread in a flange element that is connected with the first cardan joint. In this variant, the tensioning element is reached by means of a tool that is fed through the cavity in the rotor, and it can be loosened or tightened in order to separate or create the shaft-hub connection.

The tensioning element can, in this aspect, preferably be a tension rod that extends throughout the entire length of the cavity in the rotor or that is arranged only on the stator inlet side inside the rotor. A clamping nut is then attached to this tension rod; it is arranged accordingly on the stator inlet side or the stator outlet side and accessible directly or through the cavity with the proper tools.

According to a further aspect of the invention, the eccentric screw pump described at the beginning or eccentric screw pump previously explained can be developed further in that the rotor is connected to the first cardan joint by means of a first shaft-hub connection and in that the first shaft-hub connection is realized as a first frusto-conical connection.

Frusto-conical connection refers here to a specific shaft-hub connection in which a conical outer circumferential area acts together with a congruent conical inner circumferential area and ensures the orientation of the rotor towards the first cardan joint and the torque transmission from the first cardan joint to the rotor. The torque transmission occurs through a force-fit transmission between the conical areas of the frusto-conical connection. The required contact pressure is realized by an axial tension force between the inner and the outer conical circumferential areas. Fundamentally, the inner circumferential area can be formed on the rotor and the outer circumferential area on the first cardan joint, or vice versa. The conical circumferential areas can be formed on separate frusto-conical flange elements, which in turn can be separably or inseparably connected to the rotor or the first cardan joint, or they can be an integral part of the rotor or the first cardan joint. An integral design of the conical area is preferable in particular on the rotor, whereas a separate design of the conical area is preferable on the cardan joint.

By providing a frusto-conical connection, a simplified disconnection of the connection between the rotor and the first cardan joint is achieved. In particular, the frusto-conical connection can be installed and fasted easily through a tensile force acting in the longitudinal direction of the rotor, has a self-centering effect, and is by and large impervious to peaks in torque. The frusto-conical connection can be separated by removing the clamping tensile force, if necessary supported by a separating force which can be realized by a corresponding puller which exercises a pushing force acting opposite to the tensile force, and moving the shaft-hub connection apart. It must be understood that the configuration of the shaft-hub connection between rotor and first cardan joint by means of a frusto-conical connection is particularly advantageous if a rotor with a cavity formed therein is used in accordance with the previously explained aspect of the invention. In this combined configuration, the tension force required for securing the frusto-conical connection can be provided by a tension element in the cavity or by a tension element that can be accessed with a tool through the cavity, and the necessary separating force required to separate the frusto-conical connection can likewise be applied through the cavity or the tensioning element that extends through this cavity. That way, both any loosening as well as tightening of the shaft-hub connection between rotor and first cardan joint can be done completely from the stator housing outlet side.

Accordingly, another preferred embodiment provides that the first tensioning element is connected to a first frusto-conical element of the first frusto-conical connection which is connected to the first cardan joint and that a tensile force is exercised via the first tensioning element on the first frusto-conical connection, which force-fits the first frusto-conical element to a second frusto-conical element of the first frusto-conical connection that is connected to the rotor, and that the first frusto-conical connection can be connected or separated from the side of the stator outlet opening by means of a tool placed on the first tensioning element.

According to another aspect of the invention, the eccentric screw pump described at the beginning or the previously explained eccentric screw pump can be developed further in that the first cardan joint is connected to a wobble shaft which is connected to a second cardan joint which is connected to a hollow shaft coupled with the drive motor by means of a second shaft-hub connection, and in that the second shaft-hub connection can be connected or separated by a second tensioning element, wherein the second tensioning element extends through the hollow shaft, is connected to the second shaft-hub connection on the side of the second cardan joint, and can be actuated with a tool on the side of the hollow shaft that is opposite from the second cardan joint or the second tensioning element can be actuated by means of a tool extending through the hollow shaft, and in that the second shaft-hub connection can be connected or separated from the side of the hollow shaft that is opposite from the second cardan joint by means of the tool placed on the second tensioning element.

This aspect of the invention solves a further problem that can arise in connection with the maintenance of eccentric screw pumps. In case of high loads and/or high wear or dry running or a combination hereof, a rotor of an eccentric screw pump can lock up inside the stator housing and is then blocked therein with regard to both, rotational movement and radial or axial movement. This blockage situation is referred to as a "seized-up rotor" and regularly requires a replacement of rotor and stator housing, in order to be able to put the eccentric screw pump back into operation. However, this blockage entails the problem that a simplified maintenance of the eccentric screw pump often requires a relative movement between stator housing and rotor in order to be able to proceed with the disassembly. Any disassembly of a stator housing with the blocked rotor inside regularly presents a significant problem due to the difficulty in accessing various screw connections.

This problem of difficult or impossible disassembly applies to eccentric screw pumps in general, but it is, in particular, also relevant for the eccentric screw pump of the type previously described offering the possibility of swiveling the stator housing. When performing maintenance on the previously described eccentric screw pump, this swiveling of the stator housing must occur before the shaft-hub connection between the rotor and the first cardan joint is separated. In the preferred embodiment of the invention, the cavity inside the rotor becomes accessible only after the swiveling has occurred, and the tensioning element arranged therein can be actuated with a tool in order to separate the shaft-hub connection between rotor and the first cardan joint. However, in this case, the swiveling of the stator housing requires a relative movement between rotor and stator housing due to the different swivel axes of rotor and stator housing, as otherwise there would be a blockage against this swiveling movement.

In order to therefore be able, in accordance with this aspect of the invention, to perform simplified maintenance on an eccentric screw pump if the rotor is blocked in the stator housing, a simple way of separating the shaft-hub connection between the second cardan joint and a shaft coupled with the drive motor is made possible. This is accomplished in that this second shaft-hub connection can be separated or set through a cavity in a hollow shaft which is coupled with the drive motor.

This configuration makes it possible, in case of a blocked rotor inside the stator housing, to separate the second shaft-hub connection without significant effort and thereby provide a simple axial movability of the blocked unit of stator housing and rotor. This axial movability allows, on one hand for a simplified disassembly of the blocked unit of stator housing and rotor. Moreover, this decoupling of the rotor from the drive motor allows for a swiveling of the stator housing along with the blocked rotor contained therein, so that once the swiveling movement has occurred, either the entire unit consisting of stator housing, rotor, first and second cardan joint as well as the wobble shaft can be removed, or the first shaft-hub connection between rotor and first cardan joint, which is now accessible, can be separated, and then the unit of rotor and stator housing can be removed.

With regard to the configuration of the tensioning elements in the first and second variant, the resulting advantages and operating options, reference is made to the above description of the two variants of the first tensioning element in connection with the cavity in the rotor, the explanations provided there can be applied, mutatis mutandis, to the second tensioning element and the cavity in the hollow shaft.

It is particularly preferable if the second shaft-hub connection is realized as a second frusto-conical connection, and the second tensioning element is connected to a first frusto-conical element of the second frusto-conical connection which is connected to the second cardan joint and a tensile force is exercised via the second tensioning element on the second frusto-conical connection, which force-fits the first frusto-conical element to a second frusto-conical element of the second frusto-conical connection which is connected to the rotor. By providing a frusto-conical connection between the second cardan joint and the hollow shaft, a robust shaft-hub connection that can be easily separated and set by means of the tensioning element is provided in turn. The second shaft-hub connection can be realized in the same form and function as the first shaft-hub connection, and the explanation given above with regard to the first shaft-hub connection apply, mutatis mutandis, also for the second shaft-hub connection. In particular, it is preferred if the first shaft-hub connection is constructed with equal dimensions and using identical parts, for example, the frusto-conical element, which is connected with the first cardan element, can be identical in design to the frusto-conical element which is connected to the second cardan joint.

It is furthermore preferable if the hollow shaft is coupled with the drive shaft of the drive motor by means of a spur gear unit or a flat gear unit. Coupling the hollow shaft with the drive motor via a gear unit facilitates accessibility of the cavity in the hollow shaft by enabling a spatial separation of the hollow shaft from the drive motor. In particular, a spur gear unit can create a radial offset between the hollow shaft and the drive shaft of the drive motor, which enables an easy accessibility of the hollow shaft in its axial direction.

According to another aspect of the invention, the eccentric screw pump described at the beginning or the eccentric screw pump previously explained can be developed further by arranging a first and/or second collar around the first and/or second cardan joint, which collar seals a lubricant-filled interior space housing the first or second cardan joint.

This aspect of the invention addresses a problem in connection with the maintenance of eccentric screw pumps which is rooted specifically in the provision of cardan joints in an access chamber for the fluid. As the fluids that are pumped with eccentric screw pumps are often laden with solids and therefore can have a mechanically as well as chemically aggressive effect, it is advantageous if the bearing points of cardan joints are not directly exposed to the fluid. According to prior art, this can be achieved in that the bearing points of cardan joints are sealed with suitable sealing rings in order to prevent fluids from entering. However, this design with encapsulated bearing points has proven unreliable in long-term operation. According to the invention it is therefore proposed to prow vide a collar around the first and/or the second cardan joint. In this, it must be understood that on one hand, an individual collar can be provided around the first cardan joint and the second cardan joint is not protected, but on the other hand, it is also possible to protect the second cardan joint with a separate collar or to protect both.

By providing a collar, the entire cardan joint is sealed from the fluid being pumped with the eccentric screw pump. The collar arranged around the cardan joint allows for a filling of lubricant inside the collar so that the cardan joint moves within a lubricant, for example oil, and consequently can work practically without wear.

It is particularly preferable that the first cardan joint is coupled with the rotor by means of a first shaft-hub connection, comprising a flange on the cardan joint side and a rotor-side flange that is separably connected thereto, and that the first collar extends from the flange on the cardan joint side, to which it is fastened forming a seal, over the first cardan joint, and/or that the second cardan joint is coupled with the drive shaft by means of a second shaft-hub connection, comprising a flange on the cardan joint side and a drive shaft-side flange that is separably connected thereto, and that the second collar extends from the flange on the cardan joint side, to which it is fastened forming a seal, to the second cardan joint. In this embodiment, the collar is arranged around the cardan and sealed so that the shaft-hub connection between the first cardan joint and the rotor or between the second cardan joint and the drive shaft or a shaft coupled with the drive shaft can be separated without having to loosen the collar in order to do so. The collar is fastened, forming a seal, on the flange on the cardan joint side which remains on the cardan joint after the shaft-hub connection is separated. This makes it possible to leave the lubricant filling inside the collar untouched during maintenance work and it avoids having to change this lubricant if, for example, a rotor must be replaced.

It is furthermore preferred if the first and second collars are realized integrally as a single collar and that a first end of the collar is fastened on a circumferential area arranged between the first cardan joint and the rotor such that a seal is formed, and in that a second end of the collar is fastened on a circumferential area arranged between the second cardan joint and a drive shaft, in particular the hollow shaft, such that a seal is formed. In this embodiment, the first as well as the second cardan joint are enveloped by a collar and thus encapsulated, wherein the collar extends, as the only collar, over the first cardan joint, the wobble shaft connecting the first with the second cardan joint, and the second cardan joint. The integral collar designed in this way is thus fastened, on the side of the two cardan joints that is opposite from the wobble shaft, onto a corresponding flange of the shaft-hub connection arranged there and sealed against the rotor or the drive shaft or a shaft coupled with the drive shaft. The unit consisting of wobble shaft with a first and second cardan joint therefore represents in itself a closed, encapsulated unit which can be installed and removed from both sides within the eccentric screw pump through corresponding shaft-hub connections without having to drain or change the lubricant fill inside the collar for both cardan joints.

Finally, a further preferred embodiment provides that the first cardan joint is connected to a wobble shaft which is connected to a second cardan joint which is coupled with the drive shaft of the drive motor, wherein the wobble shaft is arranged in a fluid feeding chamber which comprises a fluid feeding opening and is fluidly connected to the interior space of the stator. Connecting the rotor via a first and second cardan joint to a wobble shaft arranged in between these two cardan joints allows for a robust transmission of drive power from the drive motor via the two cardan joints and the wobble shaft to the rotor. The provision of two cardan joints and a wobble shaft enables the specific form of movement of the rotor inside the stator housing, consisting of an overlap of a rotating and a radial movement.

A further aspect of the invention is a method for maintaining an eccentric screw pump, comprising the following steps: separation of a stator outlet flange connection of a stator housing in the area of a stator outlet opening of the stator housing of the eccentric screw pump, separation of a stator inlet flange connection of the stator housing, which is arranged in the area of a stator inlet opening of the stator housing, wherein the stator outlet flange connection or the pump inlet flange connection comprises a flange connection area which runs at an angle of less than 90° to the longitudinal axis of the stator housing, and swiveling of a rotor arranged inside the stator housing about an articulated axis of a cardan joint, which is coupled with the rotor arranged inside the stator housing and arranged in the area of the stator outlet flange connection.

The thus defined maintenance method enables a simplified maintenance of an eccentric screw pump by making it possible to avoid a costly disassembly of rotor and stator housing at both ends and a removal of the entire rotor-stator-unit from the eccentric screw pump. Due to a tilted flange with a flange connection plane that is, consequently, not vertically oriented to the longitudinal axis of the stator housing, this is achieved by enabling a swiveling of the stator housing with the rotor located there. This swiveling of the rotor is carried out around an articulated axis of the cardan joint. For this purpose, the stator housing is separated from an inlet housing for the fluid on the side of the cardan joint by separating the stator inlet flange connection of the stator housing, thereby providing the swivelability of the stator housing.

It is particularly preferred if the stator housing is swiveled with a simultaneous translational relative movement between the stator housing and the rotor along the longitudinal axis. Through this translational shift between rotor and stator housing, the movability and freedom of the swivel movement is increased for simple maintenance by being able to compensate an offset between the swivel axis of the rotor and the swivel axis of the stator housing through his translational movement. This translational movability is especially advantageous if the swiveling of the stator housing occurs, as is often required, about an axis located in the external circumferential area of the stator inlet flange connection, while the swiveling of the rotor occurs about an axis of the cardan joint. In swiveling the stator housing, a great axial force is applied between rotor and stator due to leverage. Through this axial force, a seized up connection between stator and rotor can be released in some cases.)

The method can be developed further in that in addition, a second shaft-hub connection is separated at a second cardan joint, which is coupled via a wobble shaft with the cardan joint that is coupled with the rotor arranged in the stator housing.

In this embodiment, a cardan joint, nominally a first cardan joint is provided for which is coupled with the rotor, and a second cardan joint which is coupled with this first cardan joint via a wobble shaft. On this second cardan joint, a shaft-hub connection is separated and thereby an axial movability of the (first and second) cardan joint along the longitudinal axis of the stator housing is provided. This facilitates the swiveling of the stator housing and allows for the stator housing to be swiveled about a swivel axis which is arranged at a distance from the swivel axis about which the rotor which is arranged inside the stator housing is swiveled.

It is particularly preferred if the stator housing is swiveled without a simultaneous translational relative movement between the stator housing and the rotor along the longitudinal axis. This further development allows for a swiveling of the stator housing even if the rotor is firmly blocked therein so that no axial movability of the rotor along the length of the stator housing is possible. The movability required for a swiveling of the stator housing is then achieved through the axial movability out of the separated shaft-hub connection between the second cardan joint and a drive shaft, thereby enabling the swiveling of the stator housing about a swivel axis that is spaced out from the articulated axis of the (first) cardan joint.

It is further preferred if the second shaft-hub connection is separated by loosening a tensioning element that runs through a cavity inside a hollow shaft which extends in the direction of the longitudinal axis and which couples the second cardan joint with a drive motor or a tensioning element, or if a tensioning element is loosened by means of a tool fed through a cavity inside a hollow shaft extending in the direction of the longitudinal axis, which couples the second cardan joint with a drive motor. In this embodiment, the second shaft-hub connection at the second cardan joint is separated in a particularly efficient manner by loosening a tensioning element that extends through a cavity of a hollow shaft or that is accessible with a tool through this cavity.

It is especially preferred if the second shaft-hub connection is realized as a frusto-conical connection; in this regard, reference is made to the explanations above regarding such a frusto-conical connection.

It is further preferred if after swiveling the stator housing, a first shaft-hub connection connecting the rotor with the first cardan joint is separated. This further development permits a comfortable separation of the first shaft-hub connection after the stator housing has been swiveled so that the rotor is more easily accessible.

It is especially preferred if the first shaft-hub connection is separated by loosening a tensioning element that runs through a cavity inside the rotor which extends in the direction of the longitudinal axis, or if a tensioning element is loosened by means of a tool fed through a cavity inside the rotor extending in the direction of the longitudinal axis.

In this further development, separating the first shaft-hub connection is facilitated by loosening a tensioning element that runs through the rotor or that can be loosened by means of a tool that extends through the rotor. Regarding this preferred further development of the maintenance method according to the invention, reference is made to the explanations above regarding the design of the rotor with a cavity arranged therein. In particular, it is preferred if the first shaft-hub connection is realized for this purpose as a frusto-conical connection. Here, too, reference is made to the explanations above regarding a frusto-conical connection between the rotor and the first cardan joint.

BRIEF DESCRIPTION OF THE DRAWINGS

A preferred embodiment is shown through the following figures.

DETAILED DESCRIPTION

Figure 1:
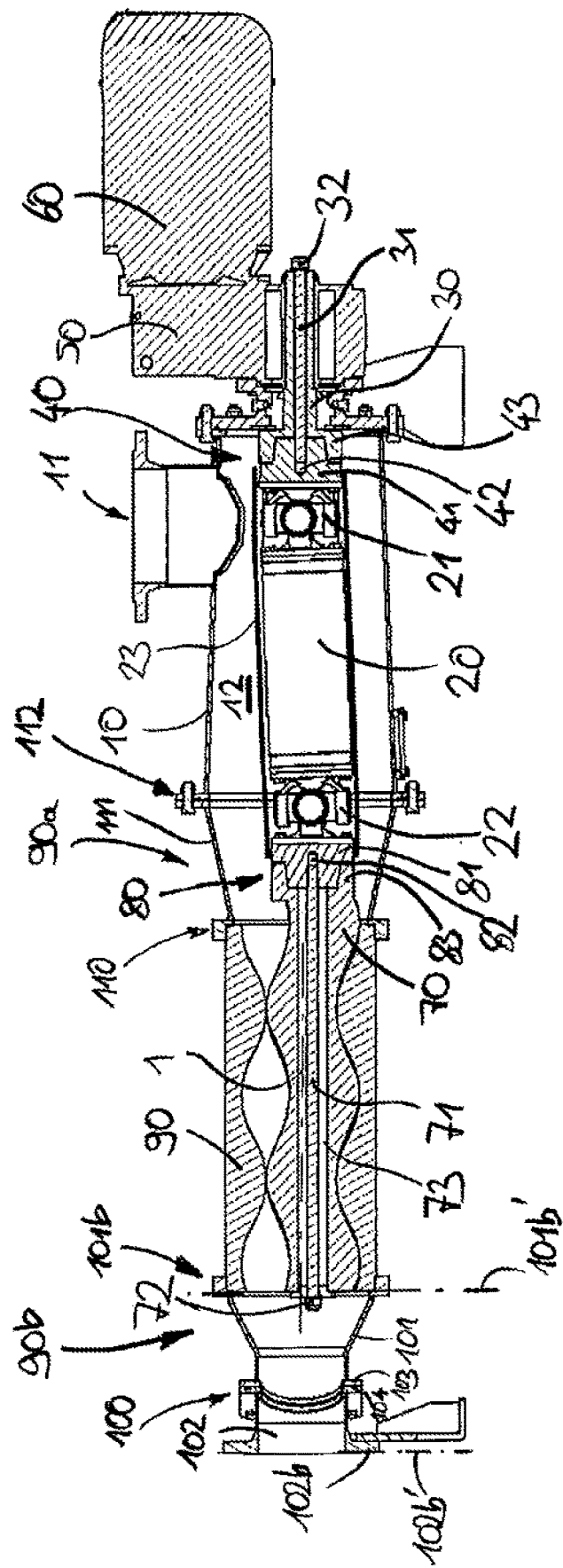
FIG. 1 a longitudinal side view of a preferred embodiment of an eccentric screw pump according to the invention in operating position.
Figure 2:
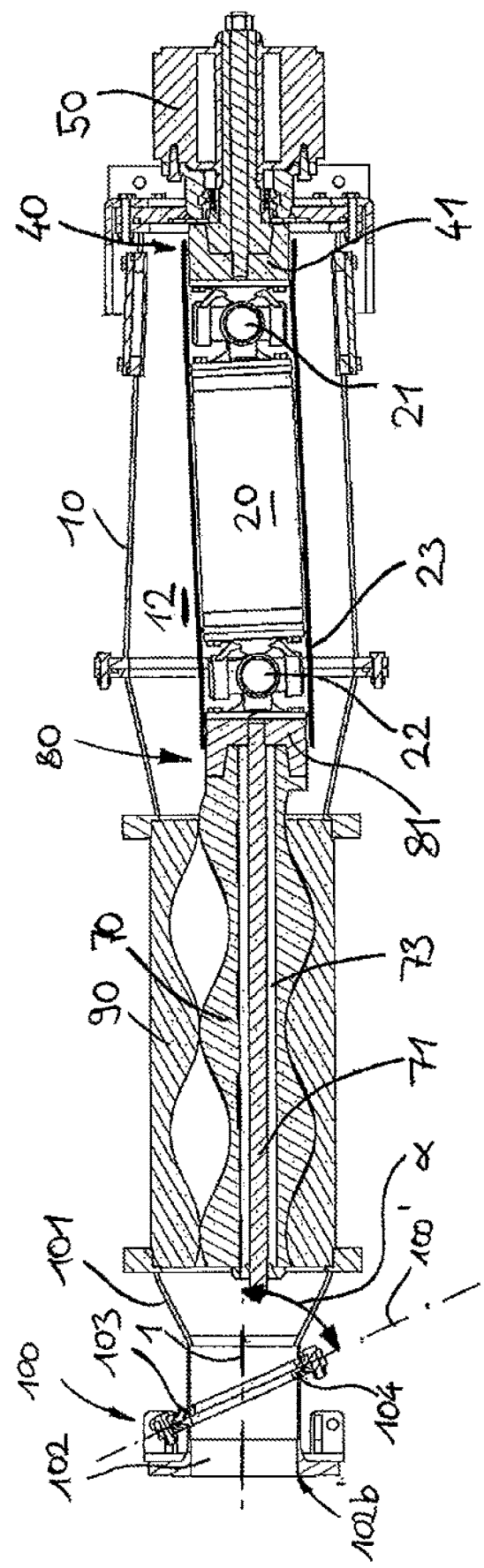
FIG. 2 a longitudinal top view of the embodiment according to FIG. 1 in operating position.

In reference to FIGS. 1 and 2 an eccentric screw pump according to the invention comprises, in a preferred embodiment, an inlet housing 10 with a fluid inlet opening 11, through which fluid can enter into a fluid feeding chamber 12 inside the inlet housing 10.

A wobble shaft 20 is arranged inside the fluid inlet chamber 12. On the drive side, the wobble shaft 20 is connected to a hollow shaft 30 by means of a cardan joint 21. The connection between the cardan joint 21 on the drive side and the hollow shaft 30 is provided by means of a shaft-hub connection 40 which is realized as a frusto-conical connection. The shaft-hub connection 40 comprises an outer frusto-cone 41 which is connected with the cardan joint 21 and in which a threaded hole 42 is formed. The outer frusto-cone 41 works together with a flange unit with an inner frusto-cone 43. The flange element with inner frusto-cone is formed integrally with the hollow shaft 30. Through the hollow shaft 30, a tension rod 31, which can be tightened at the end opposite from the frusto-conical connection 40 by means of a clamping nut 32. The tension rod 31 is screwed into the inner threaded hole 42 in the outer frusto-cone 41 and exercises a tensile force on the outer frusto-conical element 41 which presses this outer frusto-conical element 41 into the inner frusto-cone 43.

The hollow shaft 30 is coupled with a drive shaft 60 by means of a spur gear unit 50 with a drive motor.

On the side opposite from the drive-side cardan joint 21 the wobble shaft 20 is connected to a rotor 70 by means of a rotor-side cardan joint 22. The connection between the cardan joint 22 and the rotor 70 is likewise realized by means of a frusto-conical connection 80. The frusto-conical connection 80 comprises an outer frusto-conical element 81, which is connected to the rotor-side cardan joint 22 and in which an inner threaded hole 82 is formed. On the end of the rotor 70 that points to the rotor-side cardan joint, a conical recess on the face side is realized in form of an inner frusto-cone 83 which acts together with the outer frusto-cone 81.

A tension rod 71 is screwed into the inner thread hole 82; it extends through a cavity 73 in the rotor 70 and can be tightened on the end opposite from the rotor by means of a clamping nut 72.

On the outer frusto-cone 41, a collar 23 is fastened around the circumference, which is a tubular collar that extends from the outer frusto-cone 41 via the drive-side cardan joint 21, the wobble shaft 20 and the rotor-side cardan joint 22 and past the outer frusto-cone 81. On the outer frusto-cone 81, the collar 23 is in turn attached so that a seal is formed. The collar thus defines an interior space in which the two cardan joints and the wobble shaft are arranged and which may be filled with lubricant. This interior space is sealed off against the fluid inlet chamber 12 and consequently, the collar prevents mechanically or chemically aggressive fluids from reaching the cardan joints 21 or 22.

The frusto-conical connection 80 and the cardan joint 22 are located at an inlet-side end of the rotor 70 or of a stator housing 90 in which the rotor 70 is arranged. The clamping nut 72 is arranged at an outlet-side end 90b of the stator housing 90.

In the operating position shown in FIGS. 1 and 2, the stator housing 90 and the rotor 70 extend in a longitudinal direction 1, which runs essentially along the longitudinal axis of the wobble shaft 20 and the longitudinal axis of the hollow shaft 30.

At the outlet-side end 90b of the stator housing, a stator outlet flange 100 is provided. The stator outlet flange 100 combines an outlet housing 101 with a connection housing 102. The outlet housing 101 is connected to the stator housing 90 in a fluid-tight manner by means of a flange connection 101b. This flange connection 101b comprises a flange connection plane 101b' which runs vertically to the longitudinal axis 1.

For the connection of a pipe, the connection housing 102 comprises a flange connection 102b f which defines a flange connection plane 102b' which also runs vertically to the longitudinal axis 1. The flange connection planes 101b' and 102b' are thus parallel to each other.

The flange connection between the connection housing 102 and the outlet housing 101 comprises a flange connection plane 100' which runs at an angle α to the longitudinal axis 1 of the stator housing. This angle α is smaller than 90°; in the embodiment, it is 65°.

The flange connection 100 is formed by two flange surfaces 103, 104 resting on the connection housing 102 and on the outlet housing 101. These two flange surfaces are formed as ring-shaped areas and can be pressed against each other in the flange connection plane 100' by means of several screws so that a tight flange connection is created.

Figure 3:
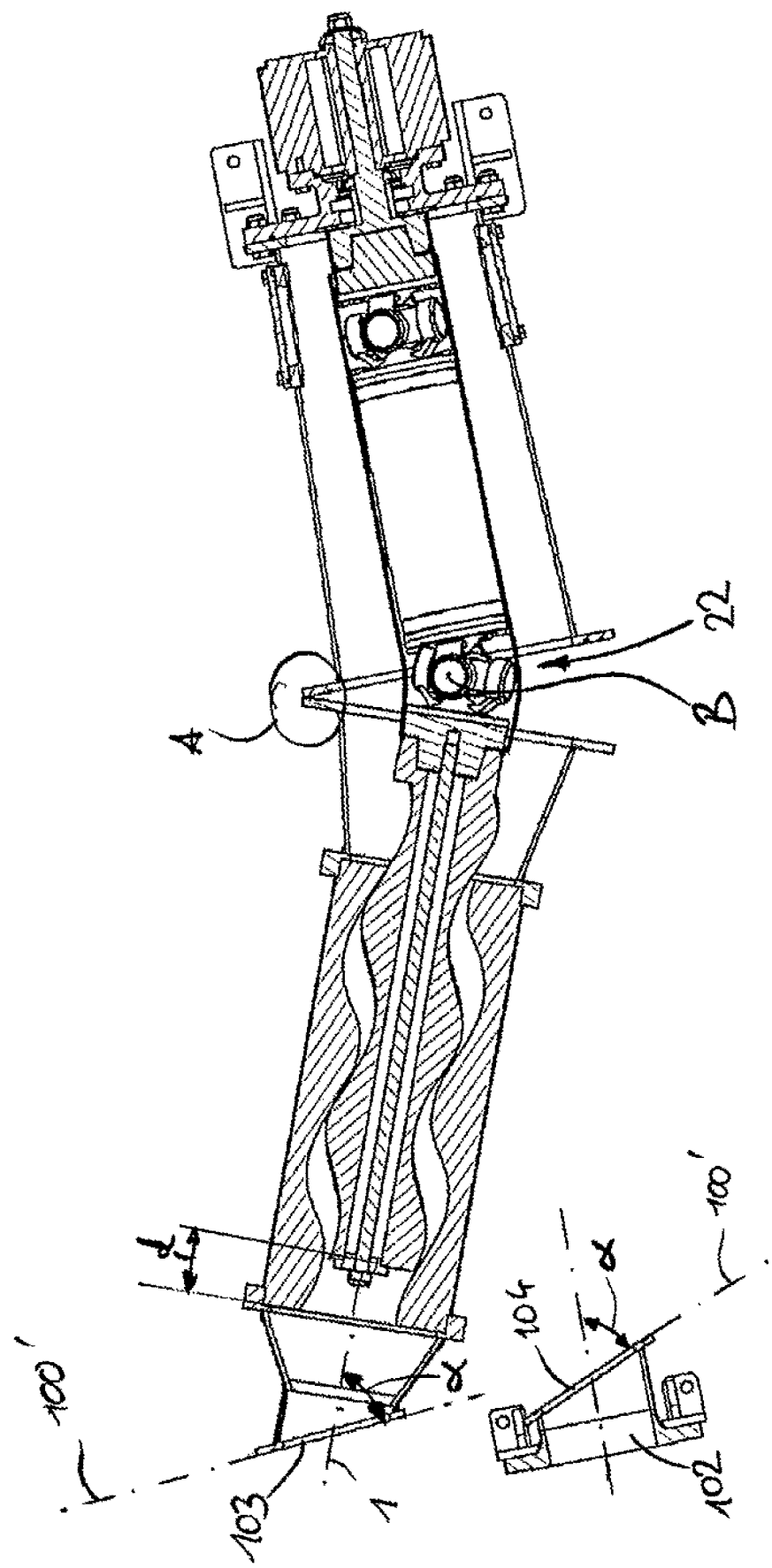
FIG. 3 a longitudinal top view of the embodiment according to FIG. 1 in a maintenance position with swivelable stator housing.

On the inlet side 90a, the stator housing 90 is connected to an inlet housing 111 by means of a flange connection 110 which is, in turn, connected to the inlet housing 10 by means of a flange connection 112. By separating the flange connection 112 and separating the flange connection 100, the stator housing can be swiveled in relation to the inlet housing 10, as shown in FIG. 3. The swivel axis of the stator housing is located approximately in an area A in the outer circumference area of the flange connection 112. The swivel axis of the rotor, which is located in the stator housing 90 during this swivel movement, is congruent with a swivel axis B of the cardan joint 22. The swivel axes A and B of the stator housing 90 and of the rotor 70 are spaced out from each other. In order to carry out the swivel movement, the rotor 70 therefore moves by the distance d in an axial direction along the longitudinal axis 1 inside the stator housing. The swivel movement of the stator housing about axis A and the need for longitudinal space associated therewith due to the spatial dimensions of the stator housing and of the inlet housing and the outlet housing mounted thereon, is made possible by the tilted position of the flange connection area 100'. The swivel movement of the stator housing shown in FIG. 3 can therefore be carried out with a fixed connection housing 102 and a fixed outlet housing 10. As a result, a pipe connected to the connection flange 102b of the connection housings 102, and a pipe connected to the fluid inlet opening 11 does not need to be disassembled for the purpose of this swivel movement.

Figure 4:
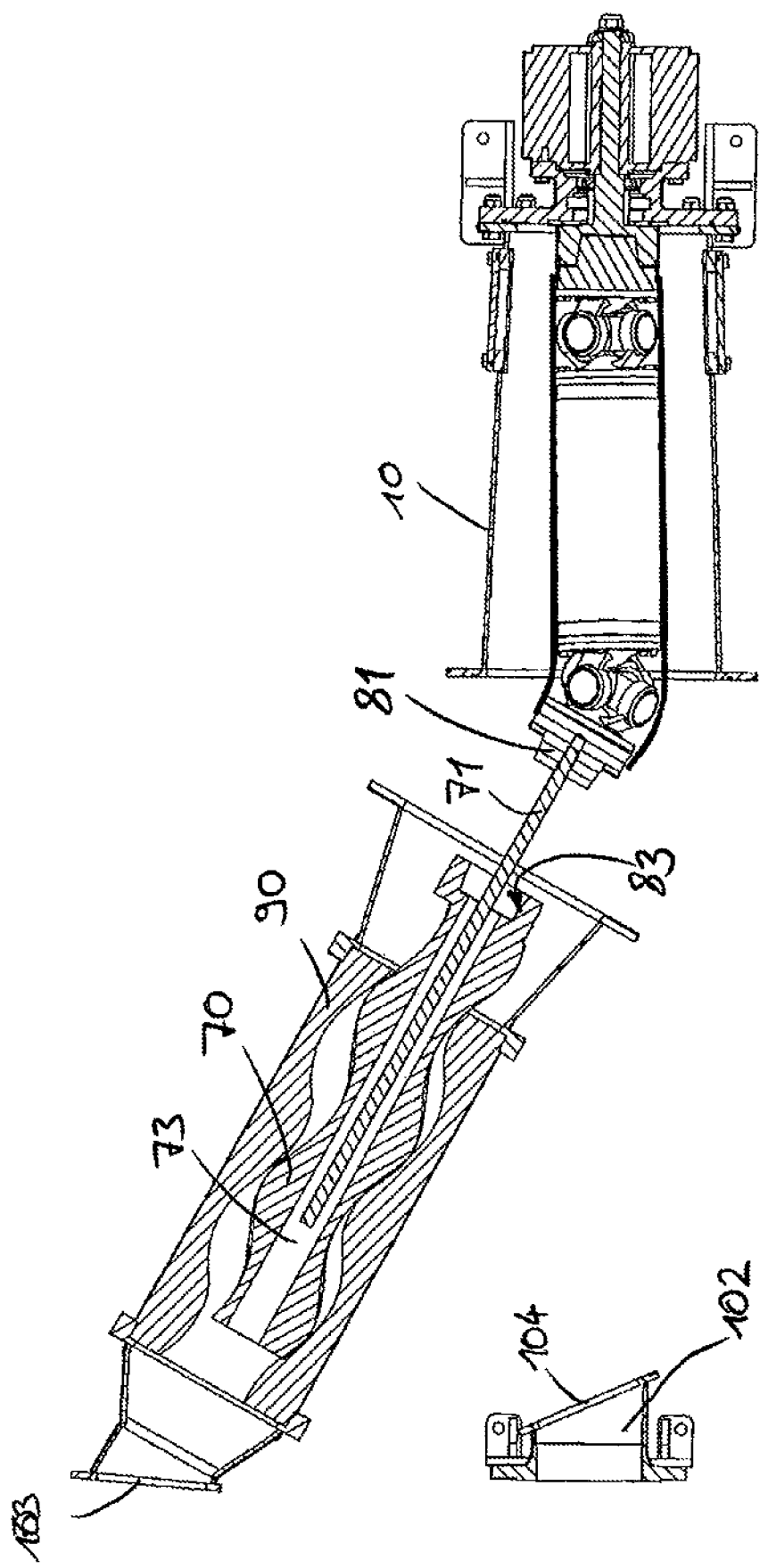
FIG. 4 a view according to FIG. 3 in a maintenance position with separated rotor.

FIG. 4 shows the eccentric screw pump according to FIG. 3 in a further, advanced maintenance position. In this advanced maintenance position, the clamping nut 72 is disassembled at the outlet-side rotor end and the frusto-conical connection 80 is separated. The tension rod 71 can thus remain at the outer frusto-cone 81 and be pulled out from the cavity 73 of the rotor. This allows for the removal of the stator housing 90 and of the rotor 70 arranged therein for the purpose of replacing the rotor, the stator housing or both components.

Figure 5:
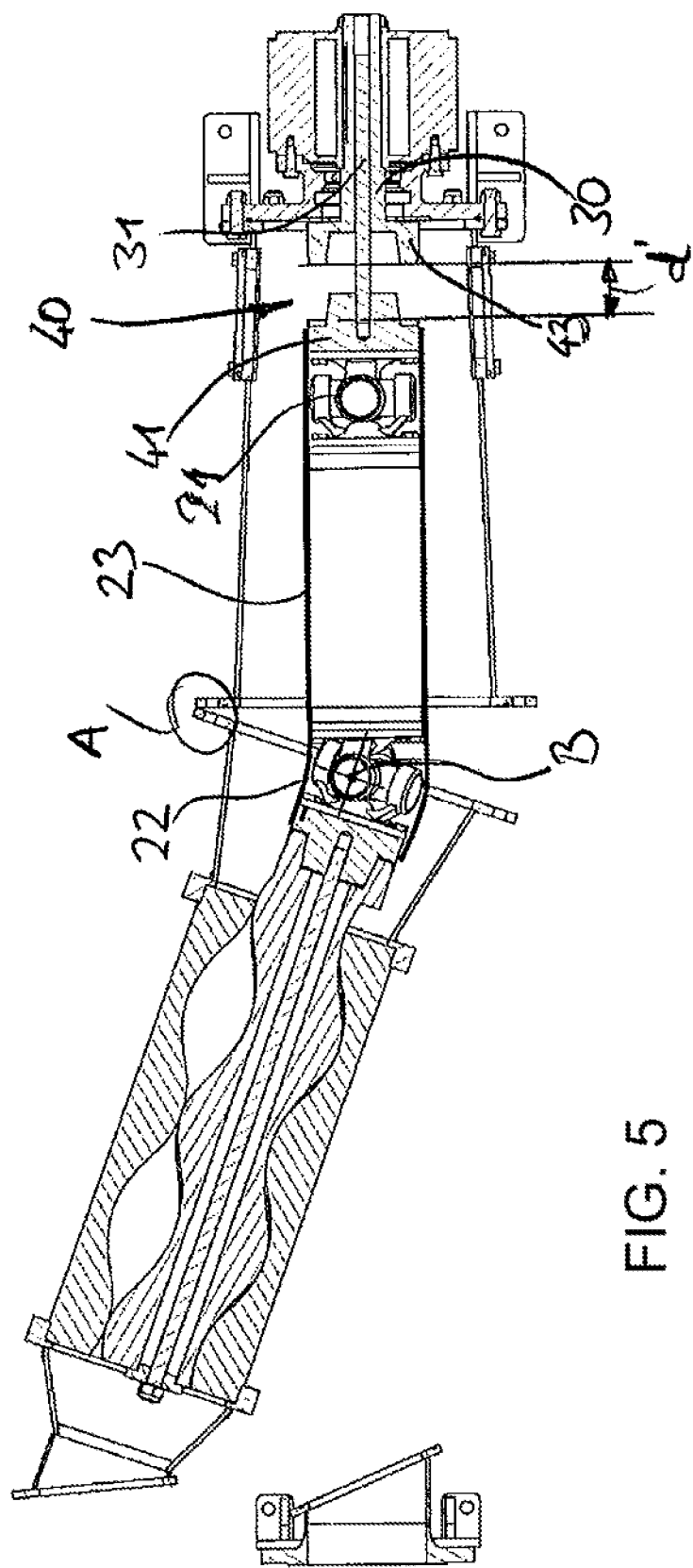
FIG. 5 a view according to FIG. 2 in a maintenance position with swiveled stator housing and blocked rotor.

FIG. 5 shows a variant of the method for maintaining the eccentric screw pump. This maintenance variant is necessary if the rotor is blocked inside the stator, thereby making the axial movement by distance d impossible.

In order to enable in such a situation a simplified maintenance by swiveling the stator housing about an axis in area A while at the same time swiveling the rotor about an axis B of the rotor-side cardan joint which is spaced out from the axis in area A, the clamping nut 32 of the tension rod 31 is loosened inside the hollow shaft 30, thereby separating the frusto-conical connection 40. By separating the frusto-conical connection 40 in this manner, the rotor can now be moved axially by a distance d' along with the two cardan joints 21, 22 and the wobble shaft 20, thereby enabling the swiveling of the stator housing 90 and the rotor 70 in the blocked form about two spaced-out swivel axes in area A and B through a translational movement of the swivel axis. This swivel movement can likewise be carried out without disconnecting a pipe from the connection housing 102 and the fluid inlet opening 11.

What is claimed is:

1. An eccentric screw pump, comprising:
   a rotor which extends along a longitudinal axis of the rotor from a drive end to a free end;
   a stator housing with an interior space which extends along the longitudinal axis from a stator inlet opening to a stator outlet opening and is designed to accommodate the rotor;
   a drive motor with a drive shaft which is coupled with the rotor to transmit a torque;
   a first cardan joint which is placed between the drive shaft and the rotor; and
   a stator outlet flange which is arranged in a direction of flow behind the rotor,
   wherein the longitudinal axis runs through the stator outlet flange and the stator outlet flange comprises a flange connection plane that intersects the longitudinal axis and is not oriented vertically to the longitudinal axis.

2. The eccentric screw pump according to claim 1, wherein the flange connection plane sits at an angle to the longitudinal axis which is smaller than 90°.

3. The eccentric screw pump according to claim 1, wherein the flange connection plane sits at an angle to the longitudinal axis which is smaller than (90°−arctan(d/I)), and wherein
   d equals an outer diameter of the end of the stator housing located opposite from the flange connection plane, and
   l equals a length of the stator housing.

4. The eccentric screw pump according to claim 1, wherein an angle by which the flange connection plane is tilted against the longitudinal axis lies in a horizontal plane.

5. The eccentric screw pump according to claim 1, wherein the first cardan joint is connected to a wobble shaft which is connected to a second cardan joint which is coupled with the drive shaft of the drive motor, and wherein the wobble shaft is arranged in a fluid feeding chamber which comprises a fluid feeding opening and which is fluidly connected to the interior space of the stator.

6. The eccentric screw pump according to claim 1, wherein a first collar is arranged around the first cardan joint and seals a lubricant-filled interior space housing the first cardan joint, and wherein a second collar is arranged around a second cardan joint and seals a lubricant-filled interior space housing the second cardan joint.

7. The eccentric screw pump according to claim 6,
wherein the first cardan joint is coupled with the rotor by means of a first shaft-hub connection, comprising a flange on the cardan joint side and a rotor-side flange that is separably connected thereto, and wherein the first collar extends from the flange on the cardan joint side, to which it is fastened forming a seal, over the first cardan joint, and
wherein the second cardan joint is coupled with the drive shaft by means of a second shaft-hub connection, comprising a flange on the cardan joint side and a flange on the drive shaft side that is separably connected thereto, and wherein the second collar extends from the flange on the cardan joint side, to which it is fastened forming a seal, over the second cardan joint.

8. The eccentric screw pump according to claim 6, wherein the first and second collars are realized integrally as a single collar and wherein a first end of the collar is fastened on a circumferential area arranged between the first cardan joint and the rotor such that a seal is formed, and wherein a second end of the collar is fastened on a circumferential area arranged between the second cardan joint and the drive shaft such that a seal is formed.

9. An eccentric screw pump comprising:
a rotor which extends along a longitudinal axis of the rotor from a drive end to a free end;
a stator housing with an interior space which extends along the longitudinal axis from a stator inlet opening to a stator outlet opening and is designed to accommodate the rotor;
a drive motor with a drive shaft which is coupled with the rotor to transmit a torque;
a cardan joint which is placed between the drive shaft and the rotor; and
a stator outlet flange which is arranged in a direction of flow behind the rotor,
wherein the rotor is connected to the cardan joint by a shaft-hub connection which is arranged on a side of the stator inlet opening,
wherein the rotor comprises a cavity that extends along the longitudinal axis,
wherein a tensioning element extends through the cavity or which is accessible through the cavity, and
wherein the tensioning element is selectively engaged with the shaft-hub connection such that the tensioning element can connect the rotor to the cardan joint or separate the rotor from the cardan joint.

10. The eccentric screw pump according to claim 9, wherein the rotor is connected to the cardan joint by the shaft-hub connection, and wherein the shaft-hub connection is a frusto-conical connection.

11. The eccentric screw pump according to claim 10,
wherein the tensioning element is connected to a first frusto-conical element of the frusto-conical connection that is connected to the cardan joint, wherein a tensile force is exercised via the tensioning element on the frusto-conical connection, which force-fits the first frusto-conical element to a second frusto-conical element of the frusto-conical connection, and wherein the second frusto-conical element is connected to the rotor, and
wherein the tensioning element selectively connects or separates the frusto-conical connection from the side of the stator outlet opening.

12. An eccentric screw pump comprising:
a rotor which extends along a longitudinal axis of the rotor from a drive end to a free end;
a stator housing with an interior space which extends along the longitudinal axis from a stator inlet opening to a stator outlet opening and is designed to accommodate the rotor;
a drive motor with a drive shaft which is coupled with the rotor to transmit a torque;
a first cardan joint which is placed between the drive shaft and the rotor; and
a stator outlet flange which is arranged in a direction of flow behind the rotor,
wherein the first cardan joint is connected to a wobble shaft which is connected to a second cardan joint, wherein the second cardan joint is coupled with a hollow shaft, and wherein the hollow shaft is coupled with the drive motor by a shaft-hub connection,
wherein a tensioning element extends through the hollow shaft or which is accessible through the hollow shaft, wherein said tensioning element is selectively connected to the shaft-hub connection on a side of the second cardan joint such that the tensioning element can connect or separate the shaft-hub connection.

13. The eccentric screw pump according to claim 12, wherein the shaft-hub connection is a frusto-conical connection, and wherein the tensioning element is connected to a first frusto-conical element of the frusto-conical connection, wherein the first frusto-conical element is connected to the second cardan joint and a tensile force is exercised via the tensioning element on the second frusto-conical connection, which force-fits the first frusto-conical element to a second frusto-conical element of the frusto-conical connection, and wherein the second frusto-conical element is connected to the rotor.

14. The eccentric screw pump according to claim 12, wherein the hollow shaft is coupled with the drive shaft of the drive motor by a spur gear unit.

15. An eccentric screw pump, comprising:
a rotor which extends along a longitudinal axis of the rotor from a drive end to a free end;
a stator housing with an interior space which extends along the longitudinal axis from a stator inlet opening to a stator outlet opening and is designed to accommodate the rotor;
a drive motor with a drive shaft which is coupled with the rotor to transmit a torque;
a first cardan joint which is placed between the drive shaft and the rotor; and
a stator inlet flange which is arranged in a direction of flow in an area of or in front of the stator inlet opening,
wherein the longitudinal axis runs through the stator inlet flange and the stator inlet flange comprises a flange connection plane that intersects the longitudinal axis and is not oriented vertically to the longitudinal axis.

16. A method for maintaining an eccentric screw pump, the eccentric screw pump comprising:
a rotor which extends along a longitudinal axis of the rotor from a drive end to a free end;
a stator housing with an interior space which extends along the longitudinal axis from a stator inlet opening to a stator outlet opening and is designed to accommodate the rotor;

a drive shaft which is coupled with the rotor to transmit a torque, wherein the drive shaft is coupled with a drive motor;

a first cardan joint which is connected to the rotor and a wobble shaft, wherein the wobble shaft is connected to a second cardan joint which is coupled with the drive shaft, wherein the first cardan joint is coupled with the rotor by means of a first shaft-hub connection, wherein the second cardan joint is coupled with the drive shaft by means of a second shaft hub connection, the method comprising:
- separating the second shaft-hub connection at the second cardan joint,
- wherein separating the second shaft-hub connection comprises:
  - loosening a tensioning element which runs through a cavity that extends in a direction of the longitudinal axis inside the drive shaft which couples the second cardan joint with drive motor, or
  - loosening a tensioning element with a tool which is fed through a cavity that extends in the direction of the longitudinal axis inside the hollow drive shaft which couples the second cardan joint with the drive motor.

17. The method according to claim 16, the method further comprising:
- separating the first shaft-hub connection connecting the rotor with the first cardan joint,
- wherein separating the first shaft hub connection comprises:
  - loosening a tensioning element which runs through a cavity that extends in the direction of the longitudinal axis inside the rotor, or
  - loosening a tensioning element with a tool which is fed through a cavity that extends in the direction of the longitudinal axis inside the rotor.

* * * * *

UNITED STATES PATENT AND TRADEMARK OFFICE
CERTIFICATE OF CORRECTION

PATENT NO. : 11,035,361 B2
APPLICATION NO. : 16/262265
DATED : June 15, 2021
INVENTOR(S) : Paul Krampe Page 1 of 1

It is certified that error appears in the above-identified patent and that said Letters Patent is hereby corrected as shown below:

In the Claims

In Column 14, Line 53, in Claim 3, delete "(d/I))," and insert -- (d/1)), --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*